United States Patent [19]

Bendel et al.

[11] 4,402,235

[45] Sep. 6, 1983

[54] GEARSHIFT DEVICE

[75] Inventors: Gunther Bendel, Tettnang; Siegfried Loffler, Friedrichshafen, both of Fed. Rep. of Germany

[73] Assignee: Zahnradfabrik Friedrichshafen A.G., Friedrichshafen, Fed. Rep. of Germany

[21] Appl. No.: 150,290

[22] Filed: May 16, 1980

[30] Foreign Application Priority Data

May 18, 1979 [DE] Fed. Rep. of Germany ......... 292036

[51] Int. Cl.³ .............................................. F01B 9/00
[52] U.S. Cl. ................................ 74/473 R; 92/138; 92/130 R
[58] Field of Search ............... 92/138, 136; 74/473 R, 74/109; 91/174; 192/82 P, 85 C

[56] References Cited

U.S. PATENT DOCUMENTS

| 1,841,629 | 1/1932 | Pigeolet | 92/136 |
| 3,498,187 | 3/1970 | Stringfellow | 92/136 |
| 3,596,534 | 8/1971 | Logan | 74/473 |

FOREIGN PATENT DOCUMENTS

| 2157153 | 2/1977 | Fed. Rep. of Germany . |
| 839153 | 6/1960 | United Kingdom . |
| 965393 | 7/1964 | United Kingdom . |
| 1004706 | 9/1965 | United Kingdom . |
| 1217134 | 12/1970 | United Kingdom . |
| 1240745 | 7/1971 | United Kingdom . |
| 1285515 | 8/1972 | United Kingdom . |
| 1425781 | 2/1976 | United Kingdom . |
| 1542417 | 3/1979 | United Kingdom . |

OTHER PUBLICATIONS

Eaton 900/1100/1200 Nebenantnebe Date: Unknown, but before May 18, 1979, 1 page.
Pederzani & Zini, Presa di Forza 3.2.39.1 Power Take Off Date: Unknown, but before May 18, 1979—2 pages.

*Primary Examiner*—Paul E. Maslousky
*Attorney, Agent, or Firm*—Lyon & Lyon

[57] ABSTRACT

A gearshift device for shifting gears to control pistons including a gearshift lever attached to a rocking shaft operated directly by a piston in a cylinder. The rocking shaft and cylinder are transverse each other, and a recess in the piston accommodates the rocking shaft. Through an engaging tooth and recess arrangement swivel action of the shaft and shift lever is effected. Alternative engaging formations may be provided. The casing for the gearshift may be integral the gearbox casing or a separate compact unit.

13 Claims, 8 Drawing Figures

GEARSHIFT DEVICE

BACKGROUND OF THE INVENTION

The invention relates to a gearshift device for the shifting of gears, control pistons or the like. Such a device can be used, for example, for an auxiliary output drive found on commercial vehicle gear units, or for use in operating control pistons.

When connecting an auxiliary output drive to the gearshift device it is conventional to use a shift lever which is attached to the forward end of a rocking shaft. On the opposite end of the rocking shaft there is provided a lever element which projects from the gearbox casing, and to which is engaged a pressure-operated cylinder which causes the rocking of the shaft together with the shift lever. The cylinder is screwed firmly to the outside of the gearshift box through an attachment plate. This attachment plate, depending upon the position of the auxiliary output drive in the gearshift box and the kind of the auxiliary output drive, has different forms and must also have different positions on the gearbox. As a result, depending upon where the gear unit is built, examination must be made in advance to determine whether the cylinder, rocking shaft, the shift lever and attachment plate can be arranged on the gearshift box in the usual manner or whether a new arrangement must be provided, for instance, by new attachment holes and possibly other attachment plates and lever elements (see ANBAUANLEITUNG FUER NEBENABTRIEBE N 352/2, N 70/1, 2 or 3 from Zahnradfabrik Friedrichshafen, Inc.). It is also standard practice in the prior art to connect an auxiliary output drive to a gearshift device by means of a cylinder parallel to the shafts which are shifted together. In such gearshift devices the shift lever, which operates the shift sleeve, is directly and rigidly connected to the piston and, by connecting and disconnecting the piston, is slid into the respective final position, through which the shift sleeve is brought directly into the desired position in each case. As the cylinder, which is parallel to the shafts which shift together, is relatively long due to the necessary, relatively long shift path, much space is thus necessary in the longitudinal direction on the gear unit.

In the prior art of swing engines it is common to produce a swivel movement by means of a transverse cylinder so that the piston rod is formed as a gear rack in which the gear wheel meshes, the gear wheel being connected to the shaft to be swiveled. The use of gear wheel and gear rack is relatively costly, both with regard to production and the need for space. In addition, when the swivel element itself has no limiting stop to its path, there must additionally be a corresponding path limit provided by the cylinder. It is an object of the invention to provide a gear shift device which is simple and inexpensive in its manufacture and maintenance, and which can be integrated into the casing of the gearshift or alternatively be an independent, compact unit which can be attached to the gear shift box (or on the casing, for example, of a control valve) depending on particular requirements. The gearshift device of the invention also occupies a minimum amount of space, in particular, in the axle direction of the gear unit.

SUMMARY OF THE INVENTION

The invention includes a gearshift device for the shifting of gears, control piston or the like, in particular for auxiliary output drives on commercial vehicle gear units with a gearshift lever attached to a rocking shaft. The rocking shaft is operated through a piston and cylinder means and coupling means between the piston and rocking shaft. The rocking shaft is in direct drive coupling with a piston for the cylinder.

The rocking shaft is equipped with a shift lever, which is in a direct drive connection with the piston.

In a preferred form of the invention, the rocking shaft and the cylinder are transverse to each other.

DRAWINGS

The invented gearshift device is described with reference to the accompanying drawings, which are:

FIG. 1 is an axial section view of a gearshift device of the invention, the view being along lines I—I of FIG. 2.

FIG. 2 is an axial section view of the gearshift device along lines II—II in FIG. 1.

FIGS. 3, 4 and 5 each shows partial, axial sectional views, similar to the views of FIG. 2, each of the figures illustrating an embodiment.

FIG. 6 is a sectional view along lines VI—VI of FIG. 3.

FIG. 7 is a sectional view along lines VII—VII of FIG. 4.

FIG. 8 is a schematic axial sectional view of an embodiment of the invention employed for the shifting of control pistons.

BRIEF DESCRIPTION OF THE DRAWINGS

A first embodiment of the invented gearshift device 1 is depicted in FIGS. 1 and 2 the gearshift device 1 and gearbox 2 forming a gear unit, wherein the gearshift device 1 is incorporated in a gearbox 2. Through the gearshift device a shift sleeve 13, aligned gear wheels 14 or toothed shafts can be shifted together. A slide ring 12 at one end of a shift lever 11 meshes into a corresponding recess (not shown) in the shift sleeve 13. The shift lever 11 is attached at its opposite end to a rocking shaft 10 which is disposed perpendicular to the axles to be coupled. The rocking shaft 10 is in turn pivotally mounted in mating opening 4 of the gearshift box 2, the mounting securing rocking shaft 10 axially stable. Perpendicular to the rocking shaft 10 is a pressure-operated, simple cylinder in which a piston 5 operates. On one end of piston 5 there is a gasket 6 and at the opposite end of the piston 5 the support is through a pressure spring 3, the remote end of which abuts the casing of the gearbox.

Cylinder 7 can be a cylinder that is pressure-loaded on both sides, whereby the control then takes place through a 3/2 path valve.

Figure 1:
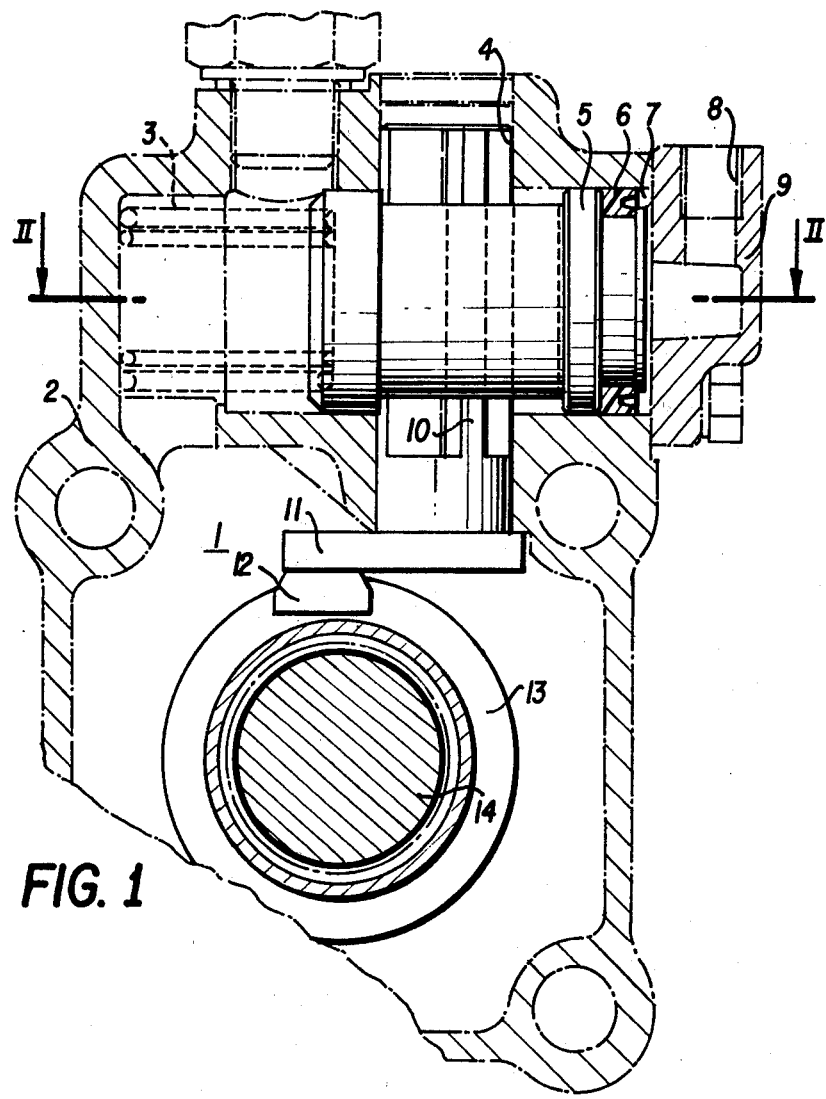

The open end of the cylinder 7 is closed by a cylinder head 9, which has a pressure input and outlet opening 8 through which the cylinder is operated. The cylinder head 9 can be equipped with a taphole in an axial direction in relation to the piston 5, so that the piston can mechanically operated in emergencies with a screw passing through the taphole.

The piston 5 has a transverse recess 17 into which the rocking shaft 10 is transversely fitted for driving connection. The rocking shaft 10 provides a drive connection with the piston 5 through a tooth 18 on the circumference of the rocking shaft 10, the tooth 18 meshing into a corresponding recess 19 in wall means on the base of the transverse recess 17.

Figure 3:
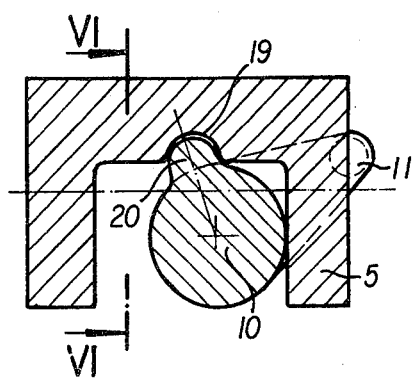

The embodiment of the gearshift device shown in FIG. 3 shows a rocking shaft 10, on whose circumference there is a cam-contoured offshoot 20, which meshes into a corresponding recess 19 on the base of the transverse recess 17.

Figure 6:
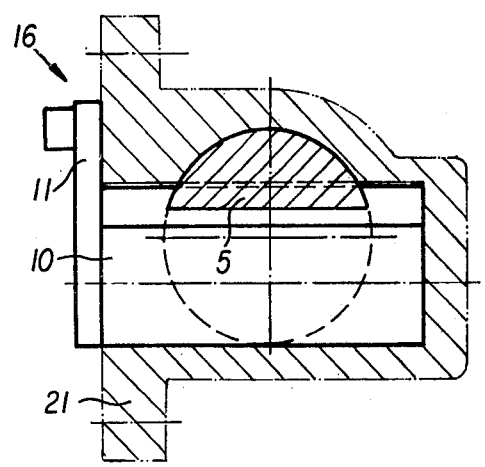

FIG. 6 shows the arrangement of the cylinder 7 and of the rocking shaft 10 with a shift lever 11 fixed on it as a compact assembly 16, which has its own casing 21 so that only the shift lever 11 projects from the casing 21.

Figure 4:
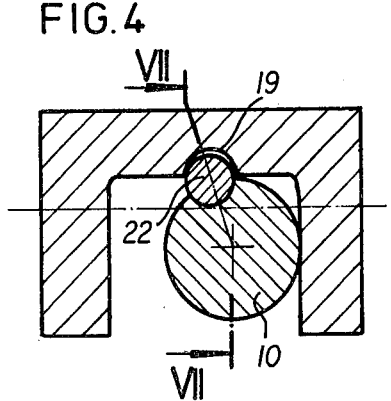

In a further embodiment shown in FIG. 4, there is a roller 22 attached in the circumference of the rocking shaft 10 in a corresponding axial recess 23. This roller 22 meshes into an equidirectional mating recess 19.

Figure 5:
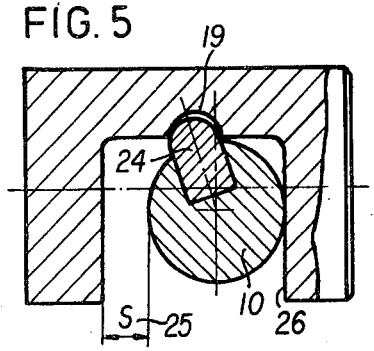

In the further embodiment of FIG. 5, a radially-pointing segment 24 is embedded on the circumference of the rocking shaft 10 in a corresponding axial recess. This segment 24 meshes into a corresponding recess 19 of the same alignment in the piston 5. The transverse recess 17 has two perpendicular arms 26, which at the same time serve as a stop for the piston 5. Thus the piston stroke 25 as indicated by the letter "S" of the cylinder 7 is the same as the difference between the distance between arms 26 of the transverse recess 17 and the diameter of the rocking shaft 10.

Figure 8:
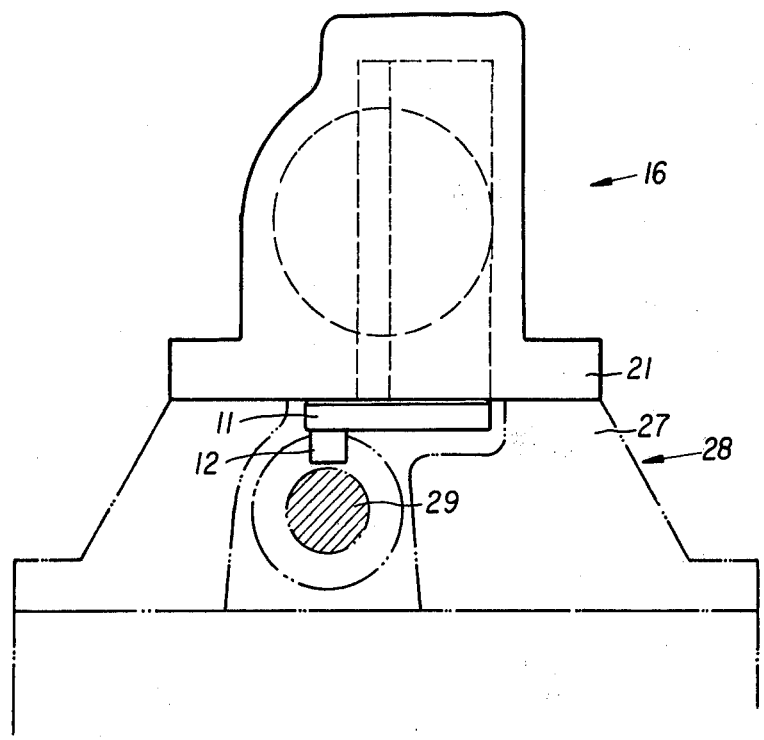

In the embodiment of FIG. 8, a valve control is shown wherein a compact assembly 16 has a flange side to its casing 21 and this is placed in abutment with the casing 27 of a control valve 28 in such a way that the shift lever 11 with its slide ring 12 meshes into a corresponding annular tee-slot (not shown) of a control piston 29.

The gearshift device of the invention operates as described below:

If, for instance, there is a connection of an auxiliary output drive to the gearshift unit, then pressure media is fed into the cylinder 7 through opening 8. As a result, piston 5 (see FIG. 1) operates and undergoes a displacement until the piston with the corresponding arms 26 of its transverse recess 17 stops on the rocking shaft 10. With such a translatory movement the piston 5 drives the tooth 18 which meshes in recess 19 by an angle corresponding to the displacement path through which the rocking shaft 10 deviates.

The same swivel movement of the rocking shaft 10 is also made by the shift lever 11 and, with it, the slide ring 12, and through this ring 12 the shift sleeve 13 is slid axially until it meshes into the gearing of the second shaft, and thus the connection is concluded.

If the auxiliary output drive is now removed again, the procedure is reversed. A pressureless condition is created in the cylinder, through which the piston is moved in the opposite direction by the pressure spring 3 up to the initial stop position. There is thus a deviation of rock shaft 10, shift lever 11 and glide ring 12 and thus also a displacement of the shift sleeve 13, thereby releasing the gear coupling.

The operation of a control piston will follow the same description as outlined above.

With the invented gearshift device, the piston 5 has a transverse recess 17 into which the rocking shaft 10 fits in its entire cross section. Through this the construction height of the gearshift device is reduced to a minimum. It is particularly advantageous that this transverse recess 17 is dimensioned so that its transverse arms 26 simultaneously provide the end stops for the piston path. As such the difference between the inside distance between the arms 26 and the diameter of the rocking shaft 10 is a measure of the piston stroke.

The drive connection between piston 5 and rocking shaft 10 according to another form of the invention is produced through a connection element 18 which can be attached both to the shaft and in the transverse recess 17 of the piston so that it is then a fixed part of a respective connection element 18 which, in each case, meshes into the corresponding recess 19 on the mating part.

Figure 2:
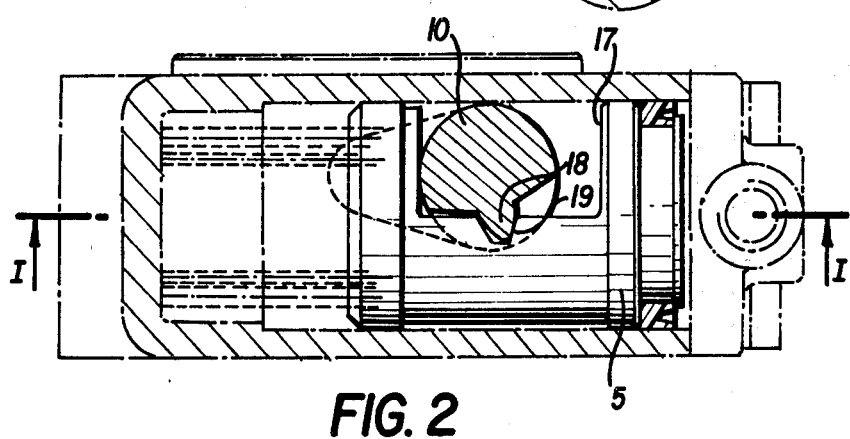

In the embodiment of FIGS. 1 and 2, the connection element is a tooth 18 provided on the rocking shaft 10, the tooth 18 meshing into a corresponding tooth gap or recess 19. In this case the rocking shaft contains a cutaway portion, and the tooth 18 extends from the cutaway portion such that the extremity of tooth 18 is contained within the circumference of the rocking shaft.

Figure 7:
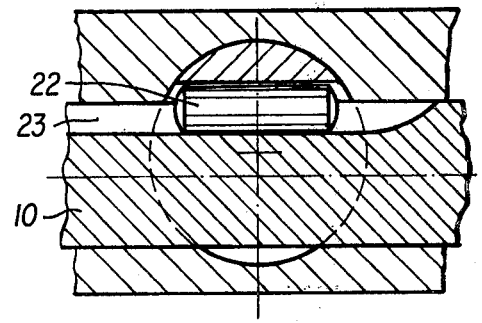

In the embodiment of FIGS. 4 and 7, the connection element is a roller 22 embedded axially on the circumference of the shaft 10, which meshes in a corresponding mating transverse recess 19 in the piston 5.

In the embodiment of FIGS. 3 and 6, the connection element is a cam-contoured offshoot 20 provided axially on the circumference of the rocking shaft 10, the offshoot 20 meshing into a corresponding recess 19 in the piston 5.

In the embodiment of FIG. 5, the connection element is a segment 24 projecting radially from the rocking shaft, the segment 24 likewise fitting into a corresponding recess 19 in the piston 5.

Each of these invented forms of the connection element can be arranged on the shaft in such a way that they project from the circumference of the shaft 10. Alternatively, the shaft 10 can also have a cutout portion on the side where the connection element is embedded. Through this the connection element 18 no longer protrudes past the basic, circular circumference of shaft 10 and there is thus a further reduction in height.

The gearshift device, consisting of cylinder, rocking shaft and shift lever, may be integrated in the casing of the gearshift unit. This arrangement is particularly advantageous and space-saving.

It is advantageous to arrange the cylinder along with the rocking shaft as a separate assembly in its own casing so that only the shift lever projects from this casing. Such an invented casing is arranged so that the assembly, as required, and depending on the manner in which the shift lever inside the gearshift unit has its optimum arrangement, can be turned by 90° in each case.

In some embodiments of the invention the shift lever can be attached to the rocking shaft in different positions.

By the use of a swivel movement for gear shifting, and the transverse arrangement of the cylinder, a significantly shorter piston path is necessary. This path can be covered by the piston in a correspondingly shorter time, and this further contributes to obtaining of a very short shifting time for the device.

The present embodiments of the invention are to be considered in all respects as illustrative and not restrictive, the scope of the invention being indicated by the appended claims rather than by the foregoing description.

We claim:

1. A gear unit including a gearshift device, said gearshift device including shift lever means, said shift lever means being affixed to an end of a rocking shaft whereby rotation of the shaft effects movement of the shift lever means in a plane radial to the shaft, a piston mounted for movement in a cylinder transversely relative to the rocking shaft, a transverse recess in the piston through which the rocking shaft passes, direct coupling means between the recess and the rocking shaft connecting the shaft and the piston, whereby movement of the piston causes rotation of the rocking shaft, and the length of the recess relative to the diameter of the rocking shaft limiting the stroke of the piston.

2. A gear unit as claimed in claim 1 said gearshift device including a cylinder head, a pressure feed inlet in the cylinder head, and helical spring means between the piston and the end of the cylinder opposite the head, the spring being adapted to urge the piston in a direction opposite to the pressure from the feed inlet.

3. A gear unit as claimed in either claim 1 wherein the piston and cylinder are transversely disposed relative to shaft means in the gear unit.

4. An actuating device for shifting an operative element of a gear unit comprising shift lever means attached to rocking shaft means, said shift lever means being adapted to engage the operative element, a piston and cylinder unit, said rocking shaft being rotatable by linear movement of said piston in said cylinder, and the rocking shaft being in substantially direct driving connection with the piston through coupling means thereby to operate the rocking shaft such that the shift lever means shifts the operative element linearly between selected positions, and wherein end walls of a transverse recess in the piston cooperates with the shaft thereby limiting the stroke of the piston.

5. The device according to claim 4, wherein the rocking shaft means and the cylinder are transversely disposed relative to each other.

6. The device according to claim 5, including a transverse recess in the piston, the rocking shaft means being located substantially in said recess.

7. The device according to any one of claims 4 to 6 wherein the coupling means for the rocking shaft and the piston includes tooth means adapted to engage a corresponding recess in the piston.

8. The device according to any one of claims 4 to 6 wherein the coupling means for the rocking shaft and the piston includes on the rocking shaft a cam-contoured, axially arranged offshoot adapted to engage in a corresponding recess in the piston, the offshoot and recess providing the couling.

9. The device according to any one of claims 4 to 6 wherein the shift lever means is adapted for attachment to the rocking shaft in different positions relative to the rocking shaft.

10. The device according to any one of claims 4 to 6 wherein the cylinder, the piston and the rocking shaft is an assembly contained in a casing, and the shift lever means protrudes from the casing.

11. The device according to any one of claims 4 to 6 wherein the cylinder, piston, rocking shaft and shift lever means are integrated into a gearbox.

12. The device according to any one of claims 4 to 6 wherein the coupling means includes a connecting element adapted to protrude from the circumference of the rocking shaft, and a corresponding recess for the connecting element is provided in the piston.

13. The device according to claim 12 including a cutaway portion of the rocking shaft, the connecting element extending from the cutaway portion such that the extremity of the connecting element is contained within the circumference of the rocking shaft.

* * * * *